（12) United States Patent
DuBois et al.

(10) Patent No.: US 9,596,290 B2
(45) Date of Patent: Mar. 14, 2017

(54) SYSTEM AND METHOD FOR PROVIDING CACHING AND PRE-FETCH OF ASSETS/MEDIA

(71) Applicant: FUJIFILM North America Corporation, Valhalla, NY (US)

(72) Inventors: Charles L. DuBois, Rochester, NY (US); Ali Seymen Ertas, Rochester, NY (US); James Dolce, Rochester, NY (US)

(73) Assignee: FUJIFILM North America Corporation, Valhalla, NY (US)

( * ) Notice: Subject to any disclaimer, the term of this patent is extended or adjusted under 35 U.S.C. 154(b) by 37 days.

(21) Appl. No.: 14/816,259

(22) Filed: Aug. 3, 2015

(65) Prior Publication Data

US 2015/0341462 A1    Nov. 26, 2015

Related U.S. Application Data

(63) Continuation of application No. 13/316,016, filed on Dec. 9, 2011, now Pat. No. 9,100,377.

(60) Provisional application No. 61/421,239, filed on Dec. 9, 2010.

(51) Int. Cl.
*G06F 15/16* (2006.01)
*H04L 29/08* (2006.01)

(52) U.S. Cl.
CPC .......... *H04L 67/06* (2013.01); *H04L 67/2847* (2013.01)

(58) Field of Classification Search
CPC ..................... H04L 67/06; H04L 67/2847

USPC ......................................................... 709/217
See application file for complete search history.

(56) References Cited

U.S. PATENT DOCUMENTS

| 7,543,138 | B1* | 6/2009 | Kawaoka | G06F 21/10 |
| | | | | 355/112 |
| 8,446,411 | B2 | 5/2013 | Gerhard et al. | |
| 2002/0112001 | A1* | 8/2002 | Sutherland | H04L 29/06 |
| | | | | 709/203 |
| 2005/0193083 | A1 | 9/2005 | Han et al. | |
| 2006/0277483 | A1 | 12/2006 | Yamamoto | |

* cited by examiner

*Primary Examiner* — Glenford Madamba
(74) *Attorney, Agent, or Firm* — Woods Oviatt Gilman LLP; Dennis B. Danella, Esq.

(57) ABSTRACT

A system and method for routing and delivering pre-fetched assets/media, such as a digital image, is provided. The present invention is directed to a system that allows for two digital images to be pre-fetched or otherwise transferred concurrently from two separate source devices to virtually expand the bandwidth and increase the efficiency of the transfer. The system also allows image enhancements to be made in a distributed manner either by a source or destination device, or by both. The invention further provides a method of efficiently delivering multiple versions of a single image to a destination device. An asset ranking system is also provided that takes into consideration the frequency at which the digital image is accessed and the number of source devices that that the digital image is stored within.

17 Claims, 2 Drawing Sheets

SYSTEM AND METHOD FOR PROVIDING CACHING AND PRE-FETCH OF ASSETS/MEDIA

CROSS-REFERENCE TO RELATED APPLICATIONS

This application is a continuation of U.S. patent application Ser. No. 13/316,016, filed Dec. 9, 2011, now U.S. Pat. No. 9,100,377 issued on Aug. 4, 2015, which claims the benefit of U.S. Provisional Application No. 61/421,239, filed on Dec. 9, 2010, which are hereby incorporated by reference in their entirety.

FIELD OF THE INVENTION

The present invention generally relates to a system and method for tracking and maintaining large numbers of groupings of data items and their interrelationships and thereby providing fast, scalable and customized access by user or application programs. Data items are considered to be assets/media. In particular, the present invention relates to providing a ranking of assets/media, pre-fetching/caching the assets/media that meet a pre-defined criteria of ranking or interest level for storage by a registration server, whereby users or application programs may access the cached asset/media for interactive functions or further processing.

BACKGROUND OF THE INVENTION

The ability to transmit, store, update, and consume a wide variety of images, documents, data files, media, and other electronic information items is at the forefront of the requirements for many industries today. Solutions to provide scalable, manageable, and robust order placement, delivery, and fulfillment, constantly plague various applications. Intrinsic to these environments is the vast amounts of data, the variations in the sources and details of such data, and the myriad of storage and delivery locations for the data. For example, given that the potential size of digital image files will depend on resolution, compression formats, and other attributes, there exists a need to provide a methodology that can be utilized to obtain images for product offerings and delivery options in a fast and consistent manner, irrespective of the file size. Importantly, such methodology needs to be transparent to the user or application program, efficient, and reliable.

The wide spread use of computing devices and application programs creates avenues for developers and applications to address data consolidation, data collation, and data migration requirements by providing systems or tools that may be utilized to facilitate end user requirements. Such a tool or system is one that addresses network asset/media access, and that may be utilized as an end-product or be integrated into existing or newly developed systems. Presently available systems and tools tend to be limited in their ability to handle multiple sources and types of data items. Access, when provided, is relatively slow and cumbersome. A user or application program is at the mercy of the availability, throughput and organization of a remote data repository such as a home or office computer, at the time of a product request. These existing systems do not employ or offer a scalable, transparent and efficient solution that can be widely deployed. As such, there is a need for significant improvement in such systems and tools.

What is needed is a tool and/or system that will facilitate and enable the ability to, in one aspect, identify and define data items relative to the data source location; provide caching and pre-fetch for quick access; provide a representation of the data items for use in application programs; eliminate the need for moving large amounts of data items across networks; and recognize patterns in the interest level of the data items.

One area in which such a tool might be beneficial is in digital photo image processing. Digital photo image processing is a rapidly growing technology area. Digital cameras and other image sources are in wide use today and a user has many options as to how the digital images are converted to a photograph and where the image may be stored. For example, users may simply download digital images from a digital camera to a computing device for direct printing. A user may also download images to a personal computer where the user may edit or otherwise modify the digital image as desired. Digital images may also be stored on mobile devices or uploaded to various social websites. Another currently available option is to physically deliver or send the digital images electronically to a photofinisher or kiosk that will print and mail the desired photos or imprint the images onto other products for the user. Yet another option enables an end user to send electronic digital images to fulfillment centers that can provide imprinting services of the images onto other goods such as greeting cards, mugs, baseball caps, bags, and a variety of other items.

In all of these instances, data is being moved around a network or from one hosting device to another. Access to the data is limited by throughput and connectivity to the hosting device, a user's memory or recollection of where things are stored, or a myriad of filing or cataloging systems that enable the user to identify the location of various images. This inefficient, ad hoc and error-prone approach creates a burden for the user. As the quantity and complexity of the data items increases, so do the adverse effects. There is currently no efficient technique for accessing and conveying a wide variety of data items, let alone increasing the speed of access to such data items even when the data items exist on multiple devices.

The present invention fills these and other needs.

SUMMARY OF THE INVENTION

In order to overcome the above stated problems, the present invention provides a system and method for pre-fetching, caching and accessing assets/media that may originate from a plurality of computing devices. In another aspect, the present invention provides said access without regard to the device status (e.g., on, off, stand-by) at the instance of request. In a further aspect, the invention provides caching and pre-fetching of assets/media for the purposes of future use. The assets/media are cached and pre-fetched from connected devices to improve availability and reduce failures that may occur as a result of hardware and network inability and/or poor network performance. In an even further aspect, the present invention enables a user to designate assets/media as cachable and further identifies the assets/media by a plurality of attributes or criteria which are utilized to rank the asset/media. In yet another aspect, the present invention provides the ability to combine multiple meta data information that pertain to copies of a particular asset/media that are located on different computing devices. The combined meta data is then associated a single unique identifier for the asset/media. Further, an "interest rating" or ranking is generated from the combined meta data. In a further aspect, the invention also determines at the instance of access to an asset/media, the best path or location from which to obtain the asset/media. In one aspect, the best path is determined by analyzing bandwidth at a particular image location, the ordered product, the asset/media quality that is demanded to fulfill the order, and the current availability of the asset/media location.

Additional benefits of the above-described system and method for providing localized user interface screens are set forth in the following discussion.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawing, wherein.

DETAILED DESCRIPTION OF THE INVENTION

Generally, the tools and methods described herein for caching and/or pre-fetching assets/media information for providing product offerings may be implemented in hardware, software or a combination thereof.

This document provides and describes an overview of an exemplary environment and implementation of the present invention. Reference is made respecting a photo ordering process to facilitate the explanation of the invention. An exemplary computer environment for the implementation and use of the invention is also presented and described.

The present invention provides a methodology to enable efficient, fast and seamless access to multimedia assets/media irrespective of the original physical location of such assets/media. An identification and classification of multimedia assets/media by a plurality of criteria and the inter-relationships among said criteria enable a ranking or determination of interest rating for individual assets/media. Assets/media having a predetermined ranking or interest rating are pre-fetched and cached to provide fast access and distribution of the assets/media as needed.

The present invention introduces a number of concepts and a unique paradigm for the identification, grouping and utilization of information that may reside in any of a plurality of physical locations including, but not limited to, a personal computer, a mobile or handheld computing device, a social network website or other data storage locations. Certain key terms need to be addressed and understood in order to appreciate the invention. The present invention is described with reference to equipment and processes relating to photography and more specifically, the photo ordering and fulfillment process. However, as would be appreciated by one skilled in the art, the invention is applicable to other processes and implementations. The references and discussion provided herein are strictly for illustrative purposes and are not intended to limit the scope of the invention.

An asset/media as used herein is a unit of reference to a specific version of data items within a given computing environment. Such data items may include a Universal Resource Identifier (URI); a computer data file—image file, document, program file; a computer folder—directory, grouping of files; or a computing media. It should be understood that the use of the term "asset" hereinafter is intended to include an asset and/or media.

An asset identifier refers to a hashed asset identifier or unique numeric and/or text string that is used to denote a snapshot of the asset for future reference.

An attribute refers to a snapshot of the state and aspects of an asset at a certain point in time for a given operating environment.

Figure 1:
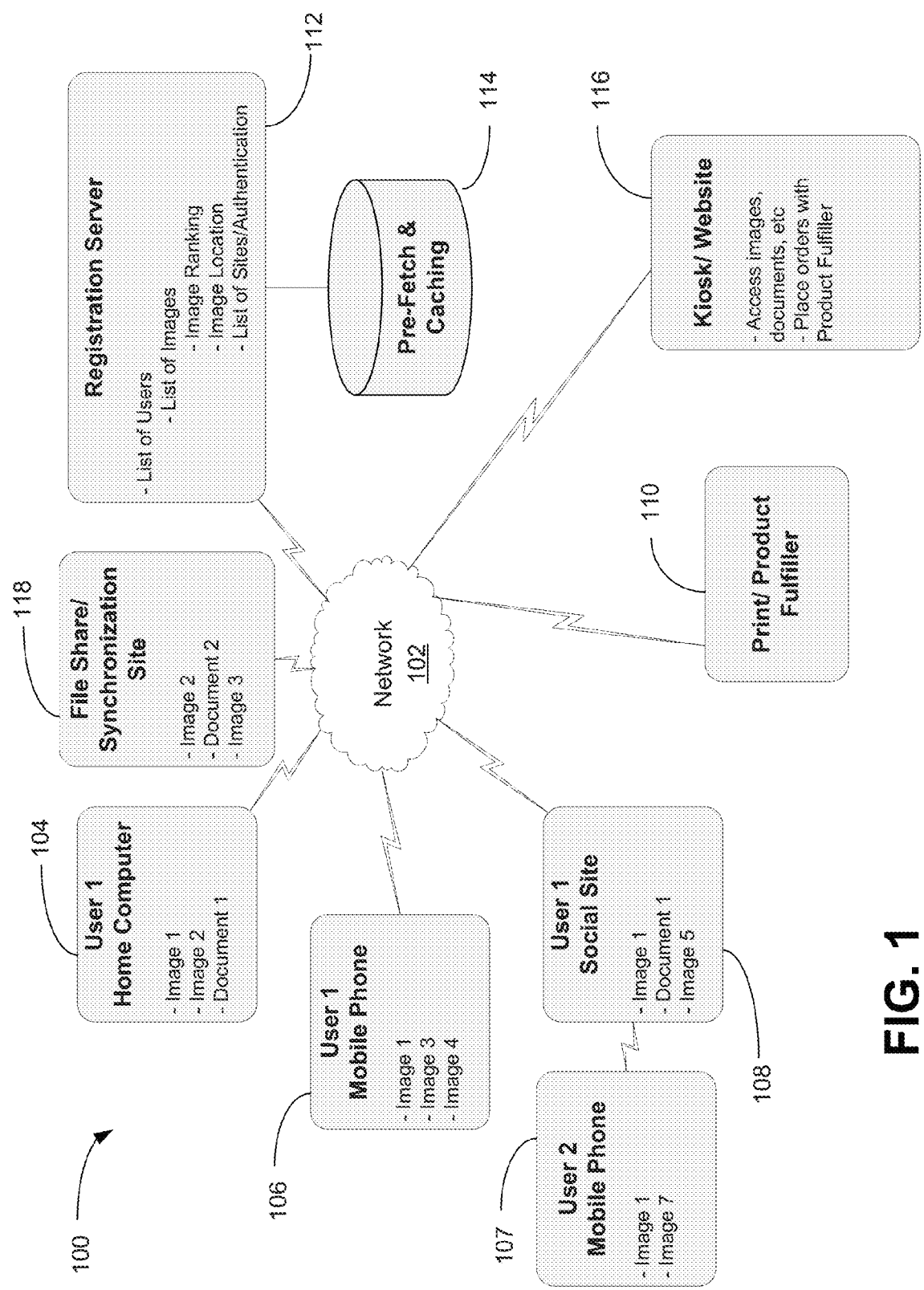
FIG. 1 generally illustrates a networking environment in which the present invention may be implemented.

Having described some base concepts of the invention, aspects of the invention will now be described with reference to the drawing figures. An exemplary environment or system to which the present invention would be applicable is shown in FIG. 1 and is designated as reference numeral 100.

The environment 100 may include a network 102, such as a Local Area Network (LAN), Wide Area Network (WAN), Wireless network or other similar configuration for allowing communication among two or more computing devices. Connected to the network 102 may be one or more general purpose computing devices. Computing devices include devices such as, but not limited to, a mobile or handheld device 106, 107, which may be a wireless device such as a laptop computer or personal computer system 104 which may be located in a home, office, retail location or other environment; a cellular phone or personal digital assistant; and a social network system 108 or file sharing/synchronization/archival site 118 or other collaborative network such as FACEBOOK, LINKEDIN, FLICKR, DropBox, SugarSync, Mozy, iCloud, etc. The computing devices 104, 106, 107, 108 provide an interface for user interaction with local or remote application programs and/or systems and are a repository for various assets. It should be noted that any of the computing devices 104,106, 108 may be directly connected to a file share 118 or social site 108, rather than the network 102, as illustrated for mobile device 107. The network 102 may also further comprise a print server or other product fulfillment system 110. The product fulfillment system 110 provides any one or more of a variety of functions including order processing of photographic prints, photo books, or the like. The product fulfillment system 110 may have its own local area network including a local server(s) and other devices for fulfilling user orders. In addition to typical devices found in any office environment, the product fulfillment system 110 may include large photo format printers, gift card printing machine, printers that are capable of printing on mugs, calendars and other items.

Also connected to the network 102 is a registration server 112. The registration server 112 provides user registration and authentication, and further provides data storage and logic for handling user lists, asset lists and asset characteristic information. A memory device 114 that is local to the registration server 112 or that may be otherwise independent of the network 102, is provided to cache, store and/or pre-fetch assets. Uniquely, certain assets are assigned a particular ranking level/interest rating.

Further connected to the network 102 is a kiosk or website 116 or the like. The kiosk or website 116 provides interaction with the various devices on the network 102 to access the cached assets and/or other assets located on any of the other computing devices 104, 106, 108. Utilizing the kiosk or website 116, assets may be accessed for viewing, printing or other processing as required by either an end user or an application program.

In operation, an end user or application program utilizing any of the computing devices 104, 106, 107, 108 registers with the registration server 112. A login or other authenticated connection by a computing device 104, 106, 107, 108 to the registration server 112 enables assets that are located on the computing device 104, 106, 107, 108 to be tagged or otherwise marked as items that should be cached or that can be cached by the system. It should be understood that while a single computing device 104, 106, 107, 108 may have multiple assets stored thereon, copies of the same asset may also be stored onto another one or more of the computing devices 104, 106, 107, 108. The stored copies of assets may also be formatted for the specific environment of the hosting one of the computing devices 104, 106, 108. For example, and as best seen in FIG. 1, the personal computer 104 may be a home computer having stored thereon image 1, image 2 and document 1. The mobile device 106 may have stored thereon image 1, image 3, and image 4. The mobile device 107 may have stored thereon image 1 and image 7. The social network system 108 may have stored thereon image 1, document 1 and an image 5. The sharing/synchronization site 118 may have image 2, image 3 and document 2 stored thereon. However, as will be appreciated by one skilled in the art, the copies of assets stored on the different devices need not necessarily be identical in all aspects. For instance, image 1 located on the mobile device 106, may be of a different resolution, size, and have a different user and metadata tags, etc., compared to the one located on the personal computer 104 or mobile device 107.

Assets that are tagged as being of interest or cacheable are uniquely identified by the system of the present invention. The identification of assets may be performed at the local level by a program, script or other means that is executing on an individual computing device 104, 106, 107, 108. Identification may alternatively be performed at the registration server 112. In either case, an asset is uniquely identified by the system and then the asset is associated, qualified, or ranked by a number of attributes. The attributes are created as meta data of the asset. In one embodiment of the present invention, for example, the attributes may include one or more of the following:

i) Individually named—a local device name or other local identifier of the asset;

ii) Used in an album—a flag indicating the use of the asset in an album collection;

iii) Ordered—a flag indicating if the asset has ever been ordered;

iv) Uploaded to another source—asset upload indicator flag;

v) Ranking (user assigned)—a user specified ranking;

vi) Shared with other users;

vii) Number of views of the asset(s);

viii) Number of prior orders and type of orders;

ix) Asset tags/attributes and the relation to user preferences (e.g., all photo images taken in Germany);

x) Unique identification of the image (unique image hash)—duplicate detection;

xi) Indicator that edits were applied (therefore increasing the "interest rating" of an image); and xii) Asset attribute—if user has "hidden" an image this will lower the "interest rating," conversely if it has been "archived," that may increase the rating.

xiii) Quantity and types of annotations from user(s).

It should be understood that the attributes of an asset do not necessarily have to be limited to the items listed above, as other attributes may also be used in the present invention.

Assets located at a different computing device 104, 106, 107, 108 may have different meta data—attributes. As such, the system of the present invention provides the ability to combine multiple meta data information from the different computing devices and associate them with a single uniquely identified asset. An asset ranking or interest rating is then determined/generated by the system by evaluating the combined meta data—combined attributes of the asset. The combined or consolidated metadata is then available to feed search, ordering, product composition/building and advertising engines. Assets meeting a pre-defined interest rating or ranking are fetched and cached by the registration server 112 for future access. In other words, returning to the specific assets of computing devices 104, 106,107, 108, image 1 will have meta data information at the personal computer 104, the mobile phone 106, the mobile phone 107 and the social network server 108. When connectivity and authentication to the registration server 112 has occurred, the system generates a unique identifier for image 1. The meta data information from each of those devices is associated with that unique identifier for image 1. The information relating to image 1 is cataloged by the registration server 112 in relation to the unique identifier. The catalog of information may include the interest level/ranking of the image, the location of the image and/or other information required by or specific to the location of the image. Such other information may be any authentication parameters that may be required by a social network in order to access the image. An interest rating/ranking for image 1 is then determined. If the interest rating/ranking meets a predefined criteria, image 1 is fetched and stored to the memory device 114. Additionally, the registration server 112 may update the metadata across all of the computing devices 104, 106, 107, 108 thus providing synchronization of metadata across all of the computing devices.

As previously mentioned, the kiosk or website 116, may be utilized to access assets. For example, if a user logs into the website 116 and authenticates to the registration server 112, by virtue of having stored thereon a listing of users, a listing of user images and image interest rating/ranking, the user may be immediately presented with highly ranked or interesting assets or conversely with a listing of all assets known to the system. A user may also utilize the website 116 to access and process specific assets from a specific device, such as picture images for viewing. In such an instance, an order may be placed for prints of the viewed images. The order is provided to the product fulfillment system 110 wherein the actual photographic prints or other merchandise bearing the image can be produced. The system and method of the present invention enables the unique asset identifier to be utilized in this ordering process rather than uploading or otherwise moving the image around the network. In other words, the unique identifier may be provided to product fulfillment system 110 which can then obtain the image via the registration server 112, to thereby take advantage of a cached image if available or the asset routing aspects of the present invention to then locate the most appropriate and accessible image.

In addition to the cataloging and caching of assets, the present invention further determines the best way to get to or obtain a particular asset or media—asset routing. Given that an asset may be available at multiple locations, the system of the present invention records the available locations, and utilizing criteria such as location bandwidth, quality of the asset demanded and availability of the location, the system determines the best source for the requested asset. This asset routing methodology may be employed for the purpose of the pre-fetching or caching assets or for the purpose of specific and direct asset requests from the kiosk/website 116. For example, if the asset that is desired at the kiosk/website 116 is a high quality version of image 1, the system of the present invention may determine on the basis of the desired quality that image 1 should be obtained from either the personal computer 104 or the social network system 108—such as FLICKR, rather than the mobile device 106 or mobile device 107. However, considering the issue of bandwidth, FLICKR (which handles high quality, high resolution images for network sharing) will have better bandwidth than the personal computer 104 sitting at a user's home. As such, FLICKR would be the preferred source. Furthermore, the personal computer 104 at the user's home may not be powered on at that moment in time. Consequently, the system of the present invention would source the image from the social network system 108.

In a further aspect of the present invention, the system and method of the present invention may be used to maximize delivery throughput by providing a virtual expanded bandwidth through enhanced asset routing and delivery. Virtual expanded bandwidth may be accomplished by providing the ability to utilize multiple asset sources to pre-fetch or otherwise transfer a plurality of images to a destination device, such as registration server 112, at a faster rate. For example, if an instruction is received or generated by the destination device to transfer two digital images to the destination device, the system of the present invention determines if one or both of those digital images are stored in the memory of different computing devices, such as personal computer 104 and social network system 108. In the event that at least image 1 is on a first computing device (e.g., social network system 108) and image 2 is on a second computing device (e.g., personal computer 104), the system of the present invention would download the respective digital images from each of the first and second computing devices concurrently. In so doing, the effective transfer rate is significantly faster than if images 1, 2 were transferred from the same computing device, or from two different computing devices consecutively (waiting for image 1 to be transferred to the destination device before starting the transfer of image 2 to the destination device). Building from the example provided above, if the request also includes transferring an additional asset, such as document 1, to the destination device, then the system and method may operate to begin transferring document 1 from the first computing device after the transfer of image 1 to destination device is complete, even if the transfer of image 2 from second computing device to the destination device is not complete. As such, the system of the present invention optimizes delivery of assets by providing sourcing of assets not just from the best source or readily available source, but it also provides a multiplexing of the delivery of information from multiple image sources.

In another aspect of the present invention, when there is a desire to provide asset enhancements, such as, but not limited to, red-eye reduction, air-brushing, touch ups, the present invention provides the ability to perform such enhancements at either the source device, destination device, or a combination of both. Logic and algorithms are implemented to provide distributed image enhancement and thereby improve advanced image delivery. A method is implemented to reduce overall delivery time of the final rendition of images by analyzing not just bandwidth between a source and the destination device, but also the processing capabilities and real time processor availability that would be required to perform any desired image enhancements at each device.

For example, if a source device, such as a personal computer 104, has less asset enhancement processing capabilities compared to a destination device, such as a registration server 112, then the system would first upload the asset from the source device to the destination device, and subsequently, the destination device would apply the selected image enhancements to the asset. In this instance, the rate at which the asset is uploaded to the destination device may be reduced since the asset is transferred prior to being enhanced. However, it should be understood that the system may also determine that one or more of the image enhancements should be made by the source device even though the source device is less efficient in applying image enhancements to the asset compared to the destination device if, for instance, the destination device would operate more efficiently if it decentralized the image enhancement processes to one or more source devices.

In a further aspect, the present invention provides added asset delivery efficiency by incorporating logic to discern the best option for delivering multiple versions of a single asset, such as a digital image. For example, consider an instance wherein both a black and white version of an image and a special effects version of the same image are desired at a destination device, such as registration server 112. The system of the present invention may employ logic to determine if both versions should be individually acquired from one or more source devices, or if one of the versions should be acquired and then have the various modifications or enhancements applied after the image is transferred to the destination device. In other words, a determination is made regarding the efficiency of obtaining a single image and applying the version modifications at the destination device rather than obtaining the individual modified versions from the source device.

In an even further aspect of the present invention, the previously described asset ranking and categorization is taken to a higher level. In this aspect, in addition to the other attributes and criteria that impact an asset ranking, the number of times an asset, such as a digital image, is utilized along with the number of locations where the image is utilized, are factored into the image ranking. For example, given that all other attributes are equal for a first and second image, if the first image is applied or utilized in a wedding album and the same first image is also utilized in compact disk collection or photo prints, and if the second image is only utilized for a photo print, then the first image would receive a higher ranking than the second image. Information regarding an image is consolidated and prioritized at registration server 112, or at some other end location, to thereby provide a more pleasurable and efficient end-user experience.

Having described the system and method of the present invention and an embodiment thereof, an exemplary computer environment for implementing the described design and execution is presented next.

Figure 2:
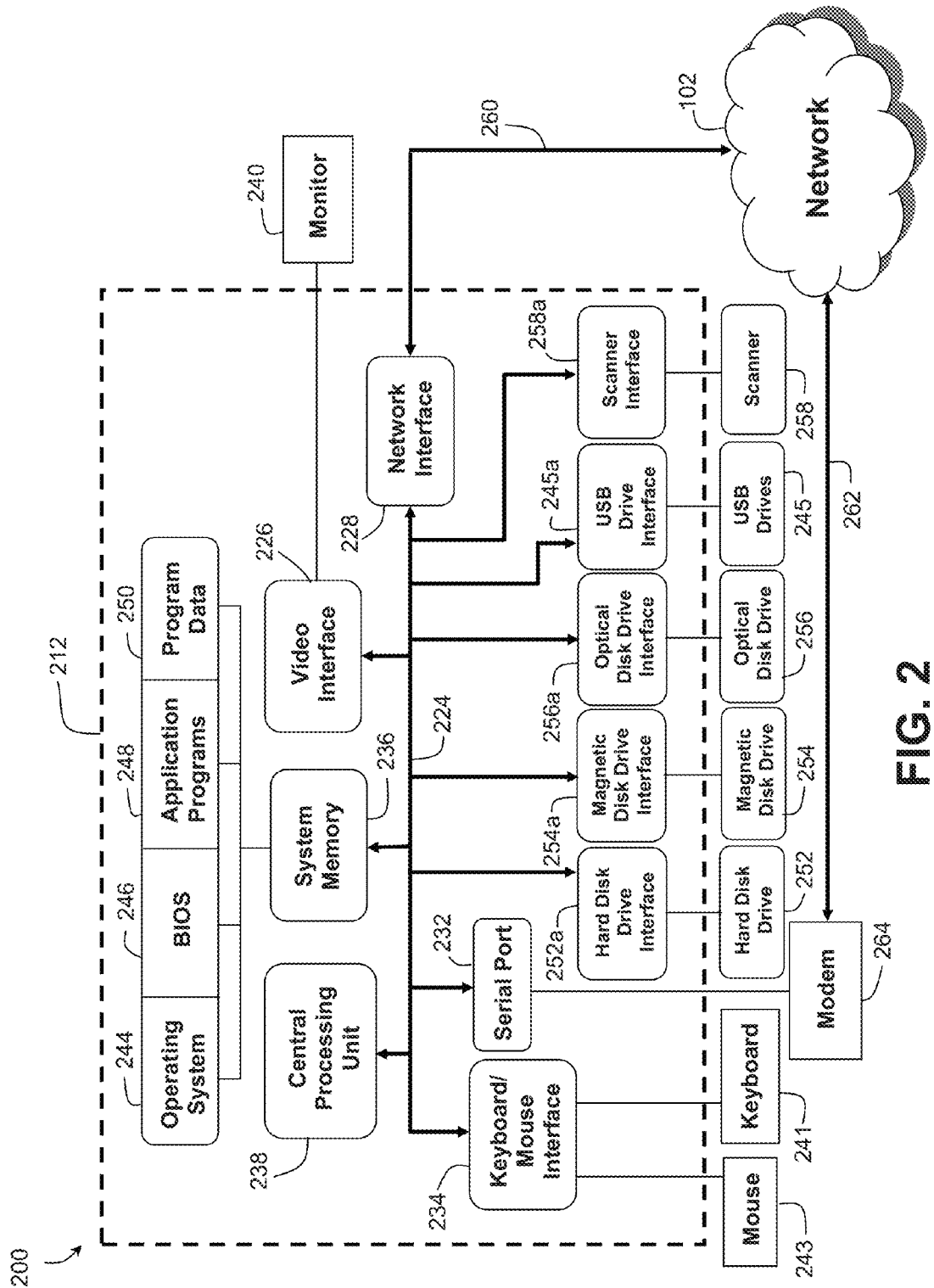
FIG. 2 is a block diagram generally illustrating a computing environment in which the invention may be implemented.

FIG. 2 shows an exemplary computing environment 200 that can be used to implement any of the processing thus far described. Computer 212 may be a personal computer including a system bus 224 that couples a video interface 226, network interface 228, one or more serial ports 232, a keyboard/mouse interface 234, and a system memory 236 to a Central Processing Unit (CPU) 238. A monitor or display 240 is connected to bus 224 by video interface 226 and provides the user with a graphical user interface to view, edit, and prepare a print order data file using the assets. The graphical user interface allows the user to enter commands and information into computer 212 using a keyboard 241 and a user interface selection device 243, such as a mouse or other pointing device. Keyboard 241 and user interface selection device are connected to bus 224 through keyboard/mouse interface 234. The display 240 and user interface selection device 243 are used in combination to form the graphical user interface which allows the user to implement at least a portion of the present invention. Other peripheral devices may be connected to computer through serial port 232 or universal serial bus (USB) drives 245 to transfer information to and from computer 212. For example, cameras and camcorders may be connected to computer 212 through serial port 232 or USB drives 245 so that data representative of an asset, such as a digitally represented still image or video, may be downloaded to system memory 236 or another memory storage device associated with computer 212 so that the images may be subsequently printed by product fulfillment system 110 in accordance with the present invention.

The system memory 236 is also connected to bus 224 and may include read only memory (ROM), random access memory (RAM), an operating system 244, a basic input/output system (BIOS) 246, application programs 248 and program data 250. The computer 212 may further include a hard disk drive 252 for reading from and writing to a hard disk, a magnetic disk drive 254 for reading from and writing to a removable magnetic disk (e.g., floppy disk), and an optical disk drive 256 for reading from and writing to a removable optical disk (e.g., CD ROM or other optical media). The computer 212 may also include USB drives 245 and other types of drives for reading from and writing to flash memory devices (e.g., compact flash, memory stick/PRO and DUO, SD card, multimedia card, smart media xD card), and a scanner 250 for scanning items such as still image photographs to be downloaded to computer 212. A hard disk interface 252a, magnetic disk drive interface 254a, an optical drive interface 256a, a USB drive interface 245a, and a scanner interface 258a operate to connect bus 224 to hard disk drive 252, magnetic disk drive 254, optical disk drive 256, USB drive 245 and a scanner 258, respectively. Each of these drive components and their associated computer-readable media may provide computer 212 with non-volatile storage of computer-readable instruction, program modules, data structures, application programs, an operating system, and other data for the computer 212. In addition, it will be understood that computer 212 may also utilize other types of computer-readable media in addition to those types set forth herein, such as digital video disks, random access memory, read only memory, other types of flash memory cards, magnetic cassettes, and the like.

Computer 212 may operate in a networked environment using logical connections with registration server 112, website 116 and/or product fulfillment system 110. Network interface 228 provides a communication path 260 between bus 224 and network 102, which allows assets and a print order data file to be communicated through network 102 to registration server 112, website 116 and/or product fulfillment system 110 after the print order data file has been established, and optionally saved in a memory, using computer 212. This type of logical network connection is commonly used in conjunction with a local area network (LAN). An asset and print order data file may also be communicated from bus 224 through a communication path 262 to network 102 using serial port 232 and a modem 264. Using a modem connection between the computer 212 and registration server 112, website 116 and/or product fulfillment system 110 is commonly used in conjunction with a wide area network (WAN). It will be appreciated that the network connections shown herein are merely exemplary, and it is within the scope of the present invention to use other types of network connections between computer 212 and registration server 112, website 116 and/or product fulfillment system 110 including both wired and wireless connections.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This aspect is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

The invention claimed is:

1. A method programmed for execution in a computing environment for the improved delivery of a digital image to a destination device, the method comprising:
providing a centralized asset and asset attribute storage and identification scheme for communicating with one or more source computing devices, wherein each of the one or more source computing devices include a memory having one or more digital images stored in the memory;
receiving a request for enhancement to one or more of the digital images;
determining if the requested enhancement of the one or more digital images should be applied using at least one of the destination device and the one or more source computing devices based on at least one of:
bandwidth between the one or more source computing devices and the destination device, or
enhancement processing capabilities of the one or more source computing devices and the destination device;
transferring, in the case where the requested enhancement of the one or more digital images will be applied at the destination device, the one or more digital images to the destination device; and
applying the requested enhancement of the one or more digital images at the destination device to provide an enhanced digital image, thereby minimizing the size and throughput of data representative of the one or more digital images that is transferred and improving the delivery of the one or more digital images to the destination device.

2. The method of claim 1, wherein in said determining step, the requested enhancement of the one or more digital images is to be provided by the destination device and the one or more source computing devices, the method comprising:

allowing the one or more source computing devices to apply a first portion of the requested enhancement to the one or more digital images to provide a first partially enhanced image;

receiving at the destination device the first partially enhanced image;

applying at the destination device a second portion of the requested enhancement to the first partially enhanced image to provide the requested enhanced digital image.

3. The method of claim 1, wherein the one or more source computing devices includes a first source computing device and a second source computing device, wherein in said determining step, the requested enhancement of the one or more digital images is to be provided by the first source computing device and the second source computing device, the method comprising:

allowing the first source computing device to apply a first portion of the requested enhancement to the one or more digital images to provide a first partially enhanced image;

allowing a second source device to apply a second portion of the requested enhancement to the one or more digital images to provide a second partially enhanced image;

receiving at the destination device the first and second partially enhanced images; and combining at the destination device the first and second partially enhanced images to provide the enhanced version of the digital image.

4. The method of claim 3, wherein the first and second partially enhanced images are concurrently transferred to the destination device.

5. The method of claim 1, wherein the centralized asset and asset attribute storage and identification scheme comprises:

allowing the one or more digital images to be tagged using the one or more source computing devices;

consolidating the associated metadata and/or cataloged information from the tagged one or more digital images; and utilizing the consolidated metadata to generate a an interest rating.

6. The method of claim 5, wherein the consolidating of metadata is provided on the destination device, wherein the consolidated metadata is utilized to feed at least one of a search, ordering, product composition or advertising engines.

7. The method of claim 6, wherein the destination device updates the metadata across each of the one or more source computing devices to provide synchronization among the one or more source computing devices and the destination device.

8. The method of claim 1, wherein the destination device is a registration server.

9. The method of claim 1, wherein the request for enhancement includes at least one of red-eye reduction or air-brushing to the one or more digital images.

10. The method of claim 1, wherein the step of determining if the requested enhancement of the one or more digital images should be applied using at least one of the destination device and the one or more source computing devices is also based on real time processor availability of the one or more source computing devices and the destination device.

11. A method programmed for execution in a computing environment for the improved delivery of a digital image to a destination device, the method comprising:

receiving a request for enhancement to one or more digital images from one or more source computing devices, wherein each of the one or more source computing devices include a memory having the one or more digital images stored in the memory;

determining if the requested enhancement of the one or more digital images should be applied using at least one of the destination device and the one or more source computing devices based on at least one of:

bandwidth between the one or more source computing devices and the destination device, or enhancement processing capabilities of the one or more source computing devices and the destination device;

transferring, in the case where the requested enhancement of the one or more digital images will be applied at the destination device, the one or more digital images to the destination device; and applying the requested enhancement of the one or more digital images at the destination device to provide an enhanced digital image, thereby minimizing the size and throughput of data representative of the one or more digital images that is transferred and improving the delivery of the one or more digital images to the destination device.

12. The method of claim 11, wherein in said determining step, the requested enhancement of the one or more digital images is to be provided by the destination device and the one or more source computing devices, the method comprising:

allowing the one or more source computing devices to apply a first portion of the requested enhancement to the one or more digital images to provide a first partially enhanced image;

receiving at the destination device the first partially enhanced image;

applying at the destination device a second portion of the requested enhancement to the first partially enhanced image to provide the requested enhanced digital image.

13. The method of claim 11, wherein the one or more source computing devices includes a first source computing device and a second source computing device, wherein in said determining step, the requested enhancement of the one or more digital images is to be provided by the first source computing device and the second source computing device, the method comprising:

allowing the first source computing device to apply a first portion of the requested enhancement to the one or more digital images to provide a first partially enhanced image;

allowing a second source device to apply a second portion of the requested enhancement to the one or more digital images to provide a second partially enhanced image;

receiving at the destination device the first and second partially enhanced images; and combining at the destination device the first and second partially enhanced images to provide the enhanced version of the digital image.

14. The method of claim 13, wherein the first and second partially enhanced images are concurrently transferred to the destination device.

15. The method of claim 11, wherein the destination device is a registration server.

16. The method of claim 11, wherein the request for enhancement includes at least one of red-eye reduction or air-brushing to the one or more digital images.

17. The method of claim 11, wherein the step of determining if the requested enhancement of the one or more digital images should be applied using at least one of the destination device and the one or more source computing devices is also based on real time processor availability of the one or more source computing devices and the destination device.

* * * * *